(12) United States Patent
Huang

(10) Patent No.: US 6,994,446 B2
(45) Date of Patent: Feb. 7, 2006

(54) LIGHT EMITTING ROTARY DOUBLE REFILL PEN

(76) Inventor: Ming Huang, 235 Chung-Ho Box 8-24, Taipei (TW)

( * ) Notice: Subject to any disclaimer, the term of this patent is extended or adjusted under 35 U.S.C. 154(b) by 128 days.

(21) Appl. No.: 10/670,852

(22) Filed: Sep. 26, 2003

(65) Prior Publication Data

US 2005/0068763 A1    Mar. 31, 2005

(51) Int. Cl.
*B43K 29/10* (2006.01)
(52) U.S. Cl. .................. 362/118; 362/201; 362/204; 362/206; 401/195
(58) Field of Classification Search ............ 362/118, 362/201, 204, 206; 200/60; 401/195, 110
See application file for complete search history.

(56) References Cited

U.S. PATENT DOCUMENTS 3,176,092 A * 3/1965 Lukasek ................. 200/60
6,158,871 A * 12/2000 Geddes et al. ............ 362/118

FOREIGN PATENT DOCUMENTS

JP          09099692 A  *  4/1997
JP       20000198296 A  *  7/2000

\* cited by examiner

*Primary Examiner*—Sandra O'Shea
*Assistant Examiner*—Anabel Ton

(57) ABSTRACT

A light emitting rotary double refill pen comprises an upper tube and a lower tube. The lower tube is installed with a refill switching unit for switching two refills. A light emitting set is installed at and secured to a lower end of an inner wall of the positioning tube. The light emitting set is installed with a light emitting body and a battery set. A spring is installed between the light emitting set and the stop cap. A top of the refill switching unit of the lower tube is fixed with an electric disk and is conductive to the light emitting set. A top of the electric disk is installed with a conductive spring and a conductive plate. When the lead is in contact with the conductive plate on the electric disk. The light emitting body lights up, otherwise, the light emitting body extinguishes.

4 Claims, 6 Drawing Sheets

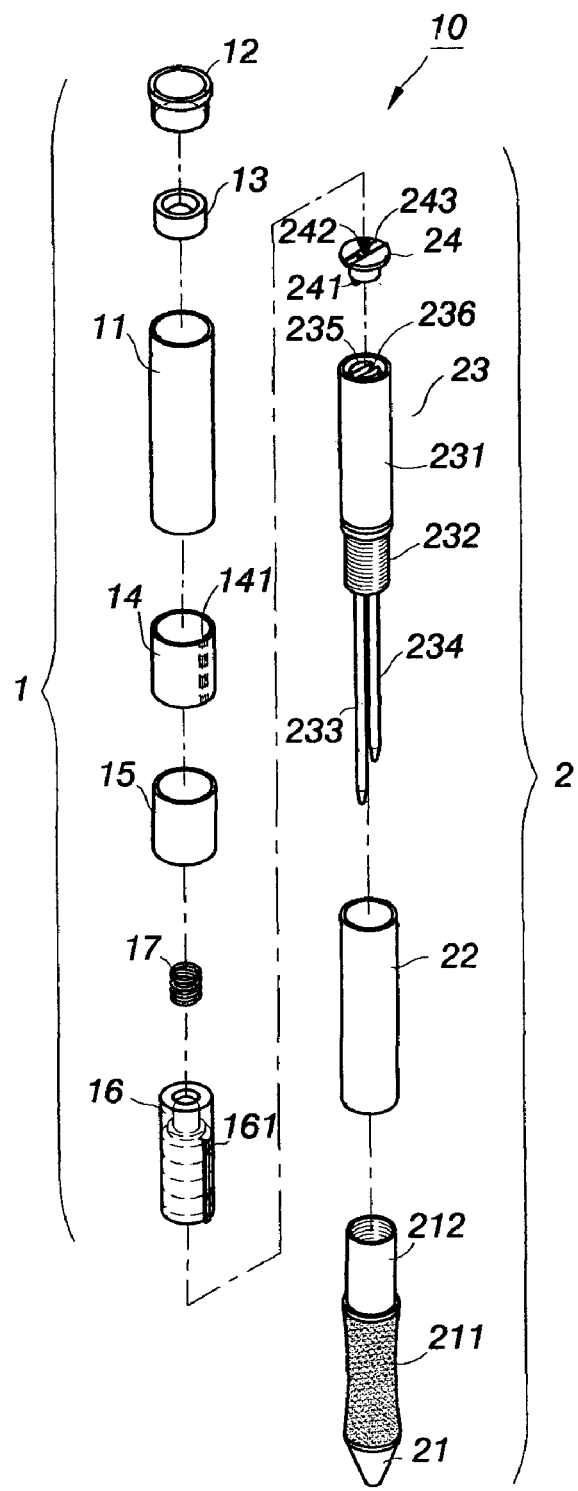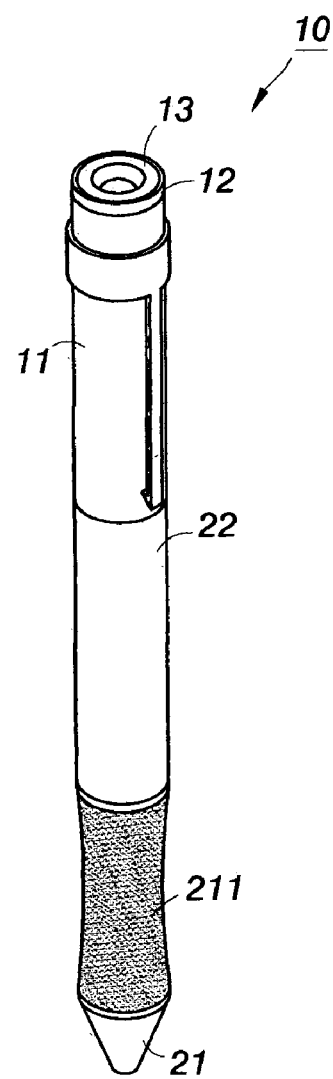
Fig.1
Fig.2

LIGHT EMITTING ROTARY DOUBLE REFILL PEN

BACKGROUND OF THE INVENTION

1) Field of the Invention

The present invention relates to light emitting pens, and particularly to a light emitting rotary double refill pen which has functions of writing, touching control, and light emitting.

2) Description of the Prior Art

One of the prior art pens with illumination function is a ball pen with a press type light emitting device at a rear end of the pen and a refill is at a front end of the pen. Thereby, when light is weak, the light emitting pen can light up by the illumination of the light emitting device.

However, in the prior art, a button or a switch is added to the pen for controlling, while the button or switch is easily actuated by careless touching so that power is consumed.

Moreover, in prior art, double refill pens are disclosed. In that pens, the switching of the two refills are by rotating an outer tube so that the refills of different colors can be switched for writing with different colors. Since currently, PDAs (personal digital assistant) are popular and the operation of the PDAs can be performed by touch control, pens to touch panels of the PDAs, the prior art double refill pens are only used to write and cannot be used to touch-control the PDAs. Moreover, the prior art double refill pen has no function of lighting up.

SUMMARY OF THE INVENTION

Accordingly, the primary object of the present invention is to provide a light emitting rotary double refill pen. The pen comprises an upper tube and a lower tube. The lower tube is installed with a refill switching unit for switching two refills. A rotary tube is in an upper tube and is a hollow tube. A stop cap is at a top of the rotary tube. A transparent mask is embedded into the stop cap. A positioning tube is at an inner upper end of the rotary tube to resist against the stop cap. A sleeve resisting against a lower edge of the positioning tube and embedded with an inner wall of the rotary tube. A light emitting set is installed at and secured to a lower end of an inner wall of the positioning tube. The light emitting set is installed with a light emitting body and a battery set. A spring is installed between the light emitting set and the stop cap. A top of the refill switching unit of the lower tube is fixed with an electric disk and is conductive to the light emitting set. A top of the electric disk is installed with a conductive spring and a conductive plate. One lead of the light emitting body is in contact with an electrode at a top of the battery set; and another lead of the light emitting body extends downward to a lower side of a casing. The lead is movable with the rotation of the light emitting body. When the lead is in contact with the conductive plate on the electric disk. The light emitting body lights up, otherwise, the light emitting body extinguishes.

The various objects and advantages of the present invention will be more readily understood from the following detailed description when read in conjunction with the appended drawing.

BRIEF DESCRIPTION OF THE DRAWINGS

FIG. 1 is an exploded perspective view of the double refill pen of the present invention.

FIG. 2 is an assembled perspective view of the double refill pen of the present invention.

DETAILED DESCRIPTION OF THE INVENTION

Figure 3:
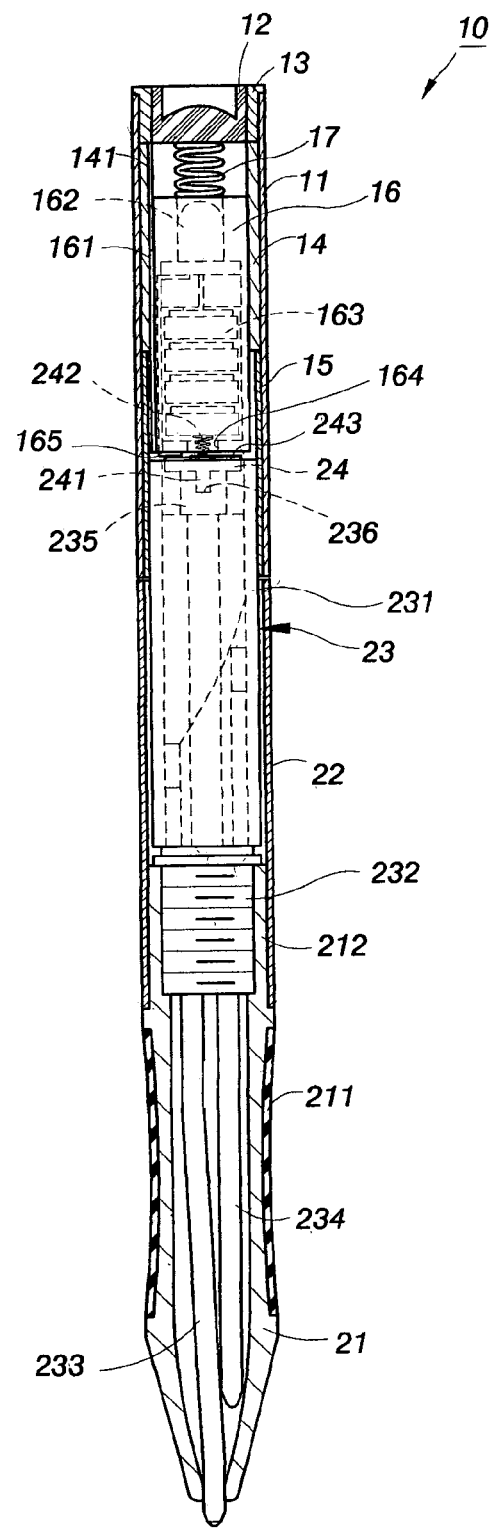
FIG. 3 is a whole cross section view of the present invention.

With reference to FIGS. 1 and 2, the exploded perspective view and assembled view of the double refill pen of the present invention is illustrated. The double refill pen 10 includes an upper tube 1 and a lower tube 2. The upper tube 1 is formed by a rotary tube 11, a stop cap 12, a transparent mask 13, a positioning tube 14, a sleeve 15, a light emitting set 16, and a spring 17. The lower tube 2 is formed by a bottom tube 21, an outer tube 22, a refill switching unit 23, and an electric disk 24. FIG. 2 is a perspective view showing the assembly of the upper tube 1 and the lower tube 2. The lower tube 2 is installed with a refill switching unit 23. An upper end of the refill switching unit 23 is embedded to the upper tube 1. When the upper tube 1 is rotated, the rotary portion 231 of the refill switching unit 23 rotates so that the two refill 233, 234 change positions.

With reference to FIGS. 1 and 3, FIG. 3 is a whole cross section view of the present invention showing the double refill pen 10 of the present invention. It is illustrated that the rotary tube 11 of the upper tube 1 is a hollow tube. A top of the rotary tube 11 is installed with the stop cap 12 (which may be transparent). Another transparent mask 13 is embedded into the stop cap 12 (in the present invention, the transparent mask 13 can be assembled with the stop cap 12). The positioning tube 14 is installed in an inner upper portion of the rotary tube 11 to resist against the stop cap 12. An inner wall of the positioning tube 14 is installed with positioning recesses 141. The sleeve 15 resists against a lower edge of the positioning tube 14 and embedded into an inner wall of the rotary tube 11. The light emitting set 16 is installed to a lower inner side of the positioning tube 14. A plurality of strips 161 at the lateral wall of the light emitting set 16 are embedded into the positioning recesses 141 of the positioning tube 14. Thereby, when the user rotates the rotary tube 11, the positioning tube 14 and the sleeve 15 rotate. The positioning tube 14 will drive the light emitting set 16 to rotate at the same time and the sleeve 15 will drive the rotary portion 231 of the refill switching unit 23. Furthermore, the spring 17 resists between the light emitting set 16 and the transparent mask 13 so that the light emitting set 16 generates a downward pressure.

The bottom tube 21 is a hollow tube and an interior thereof is tapered. An outer surface thereof can be enclosed with a skidproof layer 211. An upper end of the bottom tube 21 is a connecting portion 212. Moreover, an upper end of the refill switching unit 23 (which is a prior art) is, the rotary portion 231, and a middle section of the refill switching unit 23 is a securing portion 232. A ball pen refill 233 and a touch controlled refill 234 are installed within the bottom tube 21. The refill 233, 234 are fixed to the bottom tube 21 by the securing portion 232 and are inserted into the bottom tube 21. The outer tube 22 is connected to the connecting portion 212 at the upper end of the bottom tube 21 and shields the refill switching unit 23. A top center of the rotary portion 231 of the refill switching unit 23 has a positioning post 235 which does not rotate. A stud 241 protrudes from a lower side of the electric disk 24. The stud 241 is coupled to the positioning trench 236 in the positioning post 235. A top of the electric disk 24 is installed with a conductive spring 242 and a conductive plate 243 (having a length equal to that of the radius of the electric disk 24). Next, by the sleeve 15 to be embedded into rotary portion 231 of the refill switching unit 23, the combination of the upper tube 1 and lower tube 2 is achieved so that a lower end of the light emitting set 16 resists against a top edge of the electric disk 24.

Figures 4, 5:
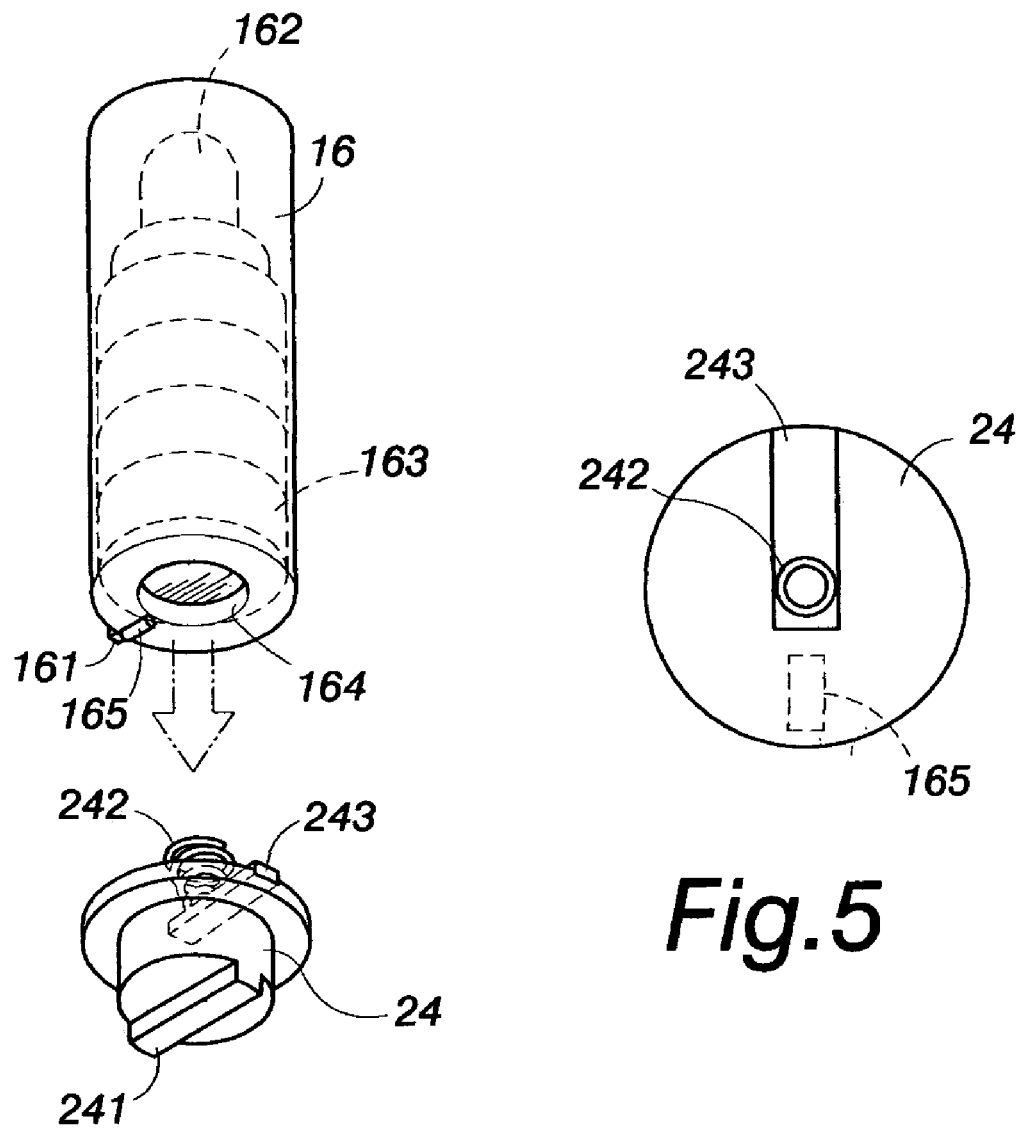
FIG. 4 is a schematic view showing the coupling of the light emitting set and the electric disk of the present invention.
FIG. 5 is a schematic view showing the coupling of the conductive lead of the present invention.

Referring to FIG. 4, it is illustrated that the casing of the light emitting set 16 is installed with a light emitting body 162 (such as an LED) and a battery set (which is formed by four small cells). A lower end of the casing has a through hole 164 so that the bottom of the battery set 163 is in contact with the conductive spring 242 of the electric disk 24. The conductive spring 17 is further connected to the conductive plate 243 installed at a lower edge of the casing. Furthermore, a lead (not shown) of the light emitting body 162 is in contact with one electrode at a top of the battery set 163 and another lead 165 extends downwards to be below the casing. This lead rotates with the light emitting set 16 so as to contact or not to contact with the conductive plate 243 on the electric disk 24 so that the light emitting body 162 will light up or distinguish. For example, the elevation view of FIG. 5 shows that the lead 165 is not in contact with the conductive plate 243. At this time, the light emitting body 162 will not light up.

Figure 6:
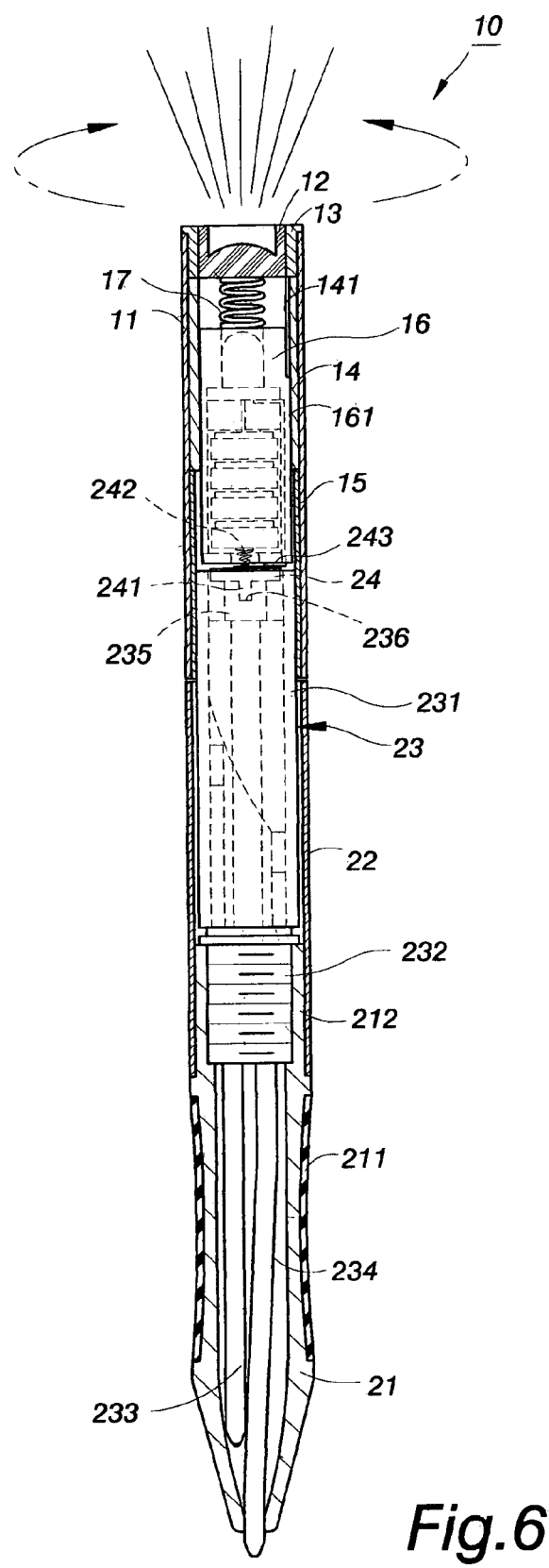
FIG. 6 is a schematic view showing that the double refill pen rotates and lights up.
Figures 7, 8:
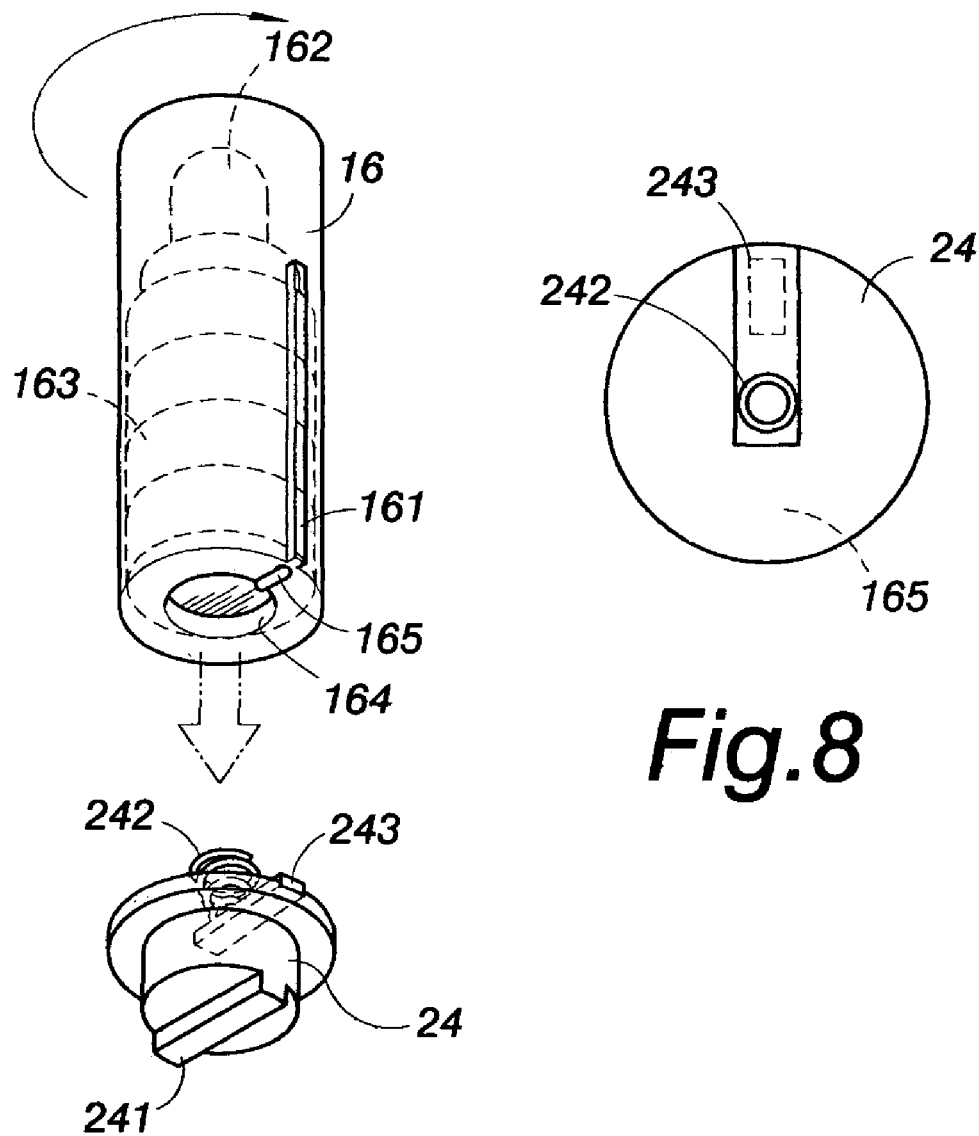
FIG. 7 is a schematic view showing the coupling of the light emitting set and the electric disk.
FIG. 8 is a schematic view showing the circuit about the rotation of the double refill pen of the present invention.

With reference to FIG. 6, when the double refill pen 10 does not act, the ball pen refill 233 and touch control refill 234 are embedded into the bottom tube 21. When the user rotates the rotary tube 11, the sleeve 15 drives the rotary portion 231 to rotate. The refill switching unit 23 can switch the refills. For example, when it rotates leftwards, the touch control refill 234 protrudes out. When it rotates backwards, the ball pen refill 233 reduces. On the contrary, when it rotates rightwards, the touch control refill 234 protrudes out. When it returns, the touch control refill 234 reduces. The operation will induce the positioning tube 14 in the rotary tube 11 drives the light emitting set 16 to rotate (referring to FIG. 7). When the lead 165 rotates to resist on the conductive plate 233 of the electric disk 24 (referring to FIG. 8), the light emitting body 162 will conduct and light up.

When the light emitting body 162 lights up, the touch control refill 234 protrudes out. When the light emitting body 162 does not light up, the touch control refill 234 will not protrude out. Thereby, the user can draw the touch control refill 234 out in advance. Thus, only the ball pen refill 233 can be used. Or the user can draw the light emitting set 16 out in advance so that the double refill pen 10 only has the function of the ball pen refill 233 and the touch control refill 234 and no light is emitted.

Figure 9:
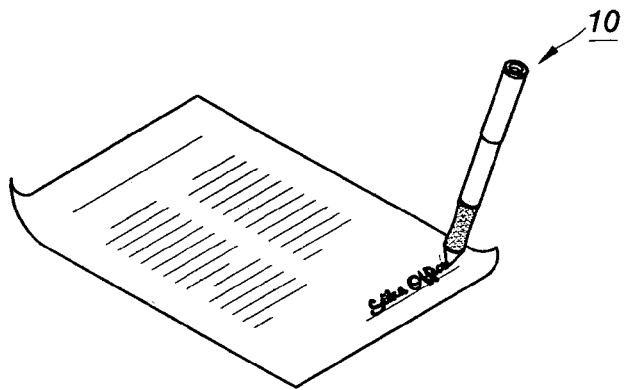
FIGS. 9–11 is a schematic view showing the embodiment of the double refill pen of the present invention.
Figure 10:
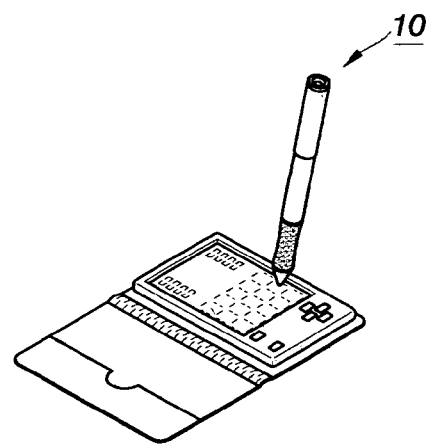
Figure 11:
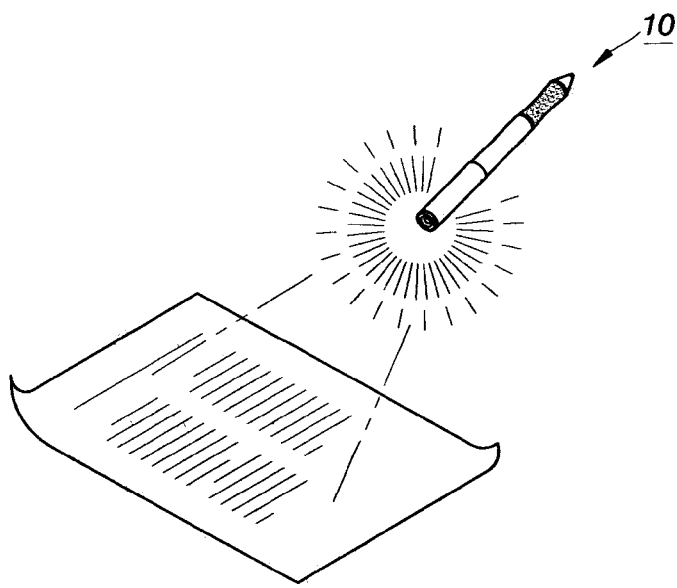

In the present invention, the control of the double refill pen 10 of the present invention is only by rotation so that the double refill pen 10 has the function of writing as shown in FIG. 9, touch controlling as shown in FIG. 10 or lighting up as shown in FIG. 10.

Advantages of the present invention will be describe herein. The present invention has the functions of writing, touching control and lighting up. The functions are performed by rotation without using any button or switch. Thereby extrusion or touching can be avoided so as to prevent from mistake. The light emitting pen can be used as an emergency illumination or for signaling or as an alarm.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A light emitting rotary double refill pen comprising an upper tube (1) and a lower tube (2), the lower tube (2) being installed with a refill switching unit (23) for switching two refills; an upper end of the refill switching unit (23) being embedded with the upper tube (1); when the upper tube (1) rotates, a rotary portion of the refill switching unit rotates to switch the two refills (233,234); further comprising: a rotary tube (11) in a upper tube (1) and being a hollow tube; a stop cap (12) at a top of the rotary tube (11); a transparent mask (13) embedded into the stop cap (12); a positioning tube (14) at an inner upper end of the rotary tube (11) to resist against the stop cap (12); a sleeve (15) resisting against a lower edge of the positioning tube (14) and embedded with an inner wall of the rotary tube (11); a light emitting set (16) installed at and secured to a lower end of an inner wall of the positioning tube (11); the light emitting set (16) being installed with a light emitting body (162) and a battery set (163); a spring (17) installed between the light emitting set (16) and the stop cap (12); wherein a top of the refill switching unit (23) of the lower tube (2) is fixed with an electric disk (24) and is conductive to the light emitting set (16) a top of the electric disk (24) is installed with a conductive spring (242) and a conductive plate (243); one lead of the light emitting body (162) is in contact with an electrode at a top of the battery set (163); and another lead of the light emitting body (162) extends downward to a lower side of a casing; the lead is movable with the rotation of the light emitting body (162); when the lead (165) is in contact with the conductive plate (243) on the electric disk (24), the light emitting body (16) lights up, otherwise, the lead (165) is not in contact with the conductive plate (243) on the electric disk (24), the light emitting body (16) extinguishes;

an inner wall of the positioning tube (14) is formed with positioning recesses (141), an outer casing of the light emitting set (16) is installed with strips (161) which can be embedded into the positioning recesses (141);

a top center of the rotary portion (231) of the refill switching unit (23) has a positioning post (235) which is non-rotational, a positioning trench (236) is formed on the positioning post (235) for receiving a rib (241) at a bottom end of the electric disk (24).

2. The light emitting rotary double refill pen as claimed in claim 1, wherein the transparent mask (13) is integrally formed with the stop cap (12).

3. The light emitting rotary double refill pen as claimed in claim 1, wherein a length of the conductive plate (243) is equal to a radius of the electric disk (24).

4. The light emitting rotary double refill pen as claimed in claim 1, wherein the two refills is a ball pen refill (233) and a touch control refill (234).

* * * * *